(12) United States Patent  (10) Patent No.: US 8,699,097 B2
Kozakura et al.  (45) Date of Patent: Apr. 15, 2014

(54) SCANNER DEVICE AND IMAGE READING AND DISPLAY METHOD

(75) Inventors: Akihisa Kozakura, Ishikawa (JP); Kosuke Ikegami, Ishikawa (JP)

(73) Assignee: PFU Limited, Ishikawa (JP)

( * ) Notice: Subject to any disclaimer, the term of this patent is extended or adjusted under 35 U.S.C. 154(b) by 1395 days.

(21) Appl. No.: 12/034,398

(22) Filed: Feb. 20, 2008

(65) Prior Publication Data

US 2008/0252943 A1  Oct. 16, 2008

(30) Foreign Application Priority Data

Apr. 13, 2007  (JP) ................................. 2007-106490

(51) Int. Cl.
  *H04N 1/04*  (2006.01)
(52) U.S. Cl.
  USPC ............................ 358/496; 358/474; 358/498
(58) Field of Classification Search
  USPC ......... 358/474, 497, 494, 471, 496, 498, 400, 358/401, 500, 505, 527; 382/312, 318, 319
  See application file for complete search history.

(56) References Cited

U.S. PATENT DOCUMENTS

| 5,038,222 | A | * | 8/1991 | Saito ............................ 358/401 |
| 5,185,821 | A | * | 2/1993 | Yoda ............................ 382/306 |
| 5,353,360 | A | * | 10/1994 | Obara .......................... 382/321 |
| 5,355,357 | A | | 10/1994 | Yamamori et al. |
| 5,443,320 | A | * | 8/1995 | Agata et al. .................. 400/715 |
| 5,479,269 | A | | 12/1995 | Bronnenberg et al. |
| 5,877,746 | A | | 3/1999 | Parks et al. |
| 6,078,407 | A | * | 6/2000 | Ma ................................ 358/474 |
| 6,314,213 | B1 | * | 11/2001 | Miyahara et al. ............. 382/312 |
| 6,320,650 | B1 | | 11/2001 | Fredlund et al. |
| 6,393,441 | B1 | * | 5/2002 | Kanerva et al. ............... 715/208 |
| 6,640,083 | B2 | | 10/2003 | Conard-White et al. |
| 7,050,206 | B2 | | 5/2006 | Payne et al. |
| 7,259,895 | B2 | * | 8/2007 | Tecu et al. ..................... 358/474 |
| 7,845,869 | B2 | * | 12/2010 | King et al. .................... 400/472 |
| 8,134,756 | B2 | * | 3/2012 | Yoneda et al. ................ 358/474 |

(Continued)

FOREIGN PATENT DOCUMENTS

| CN | 2312480 | Y | 3/1999 |
| CN | 1614985 | | 5/2005 |

(Continued)

OTHER PUBLICATIONS http://wwwjp.kodak.com/JP/ja/business/products/network/scanStation100.shtml and English Translation.

(Continued)

*Primary Examiner* — Cheukfan Lee
(74) *Attorney, Agent, or Firm* — Lowe Hauptman & Ham, LLP

(57) ABSTRACT

A scanner device includes a keyboard, a display, a control unit, and a storage unit, wherein the keyboard and the display are disposed so as to cover the top of the body of the scanner device, and the control unit includes an image reading unit that controls to read image data from original documents, an image storing unit that stores the image data read by the image reading unit in the storage unit, and a display control unit that controls to display the image data of any of the original documents on the display based on the image data stored by the image storing unit.

20 Claims, 13 Drawing Sheets

(56) References Cited

U.S. PATENT DOCUMENTS

| | | | |
|---|---|---|---|
| 2002/0060810 A1* | 5/2002 | Shiraiwa | 358/1.16 |
| 2002/0184249 A1* | 12/2002 | Shibata | 707/204 |
| 2004/0057064 A1* | 3/2004 | Stringham | 358/1.13 |
| 2004/0070798 A1 | 4/2004 | Andersen et al. | |
| 2004/0126122 A1* | 7/2004 | Kanamoto et al. | 399/20 |
| 2005/0137942 A1* | 6/2005 | LaFleur | 705/27 |
| 2005/0243364 A1* | 11/2005 | Sakai | 358/1.15 |
| 2006/0204138 A1* | 9/2006 | Yim | 382/298 |
| 2006/0261539 A1 | 11/2006 | Terada | |
| 2007/0127079 A1* | 6/2007 | Iwata et al. | 358/400 |
| 2008/0231914 A1* | 9/2008 | Motoyoshi | 358/474 |
| 2008/0252922 A1* | 10/2008 | Ikegami et al. | 358/1.15 |
| 2009/0179781 A1* | 7/2009 | Sakai et al. | 341/23 |

FOREIGN PATENT DOCUMENTS

| | | | |
|---|---|---|---|
| JP | 04332672 A * | 11/1992 | |
| JP | 05-204585 A | 8/1993 | |
| JP | 06-255211 A | 9/1994 | |
| JP | 09163057 | 6/1997 | |
| JP | 2001154757 | 6/2001 | |
| JP | 2002094711 | 3/2002 | |
| JP | 2003134284 | 5/2003 | |
| JP | 2004282439 | 10/2004 | |
| JP | 2006270200 | 10/2006 | |
| JP | 2007013607 | 1/2007 | |

OTHER PUBLICATIONS

Chinese Patent Office, Office Action dated Jan. 8, 2010.
Chinese Office Action for Application No. 200810081435.8 dated Nov. 6, 2009.
Chinese Office Action for Application No. CN200810082954.6 mailed Apr. 7, 2011.
Japanese Office Action for JP2007-106490 mailed Oct. 4, 2011.
Japanese Office Action for Application No. 2007-064280 mailed Jun. 28, 2011.

* cited by examiner

SCANNER DEVICE AND IMAGE READING AND DISPLAY METHOD

RELATED APPLICATIONS

The present application is based on, and claims priority from, Japan Application Number 2007-106490, filed Apr. 13, 2007, the disclosure of which is hereby incorporated by reference herein in its entirety.

BACKGROUND OF THE INVENTION

1. Field of the Invention

The present invention relates to a scanner device and an image reading and display method.

2. Description of the Related Art

The prevalence and spread of network such as local area network (LAN) in office environment has made popular sharing of a single device, such as a scanner device, connected to the network among a plurality of computers, also connected to the network.

Such a network scanner device is equipped with various functions that allow previewing an image data read by the scanner device, editing the preview image, sending the image data to the computers on the network, accepting password input, etc. Therefore, such a network scanner device usually comes with an input device such as a keyboard and an output device such as a display.

JP-A-5-204585 discloses a device that is obtained as a result of integrating a high-resolution display device, which has higher resolution than a character display device, with the character display device, so that read image data such as a personal or company seal can be displayed.

JP-A-6-255211 discloses a printer device capable of connecting a display and a keyboard so as to enhance input operability of mode settings of the printer.

Among network scanners, an automatic document feeder (ADF) type scanner comes equipped with the functions of continuous automatic document feeding, continuous reading of both sides of a plurality of original documents, batch conversions of large volumes of original documents into image data (of file formats such as Portable Document Format (PDF), Joint Photographic Experts Group (JPEG), Tagged Image File Format (TIFF), MTIFF (multi TIFF)), etc., when the original documents are set in the ADF.

Scan Station 100 produced by Eastman Kodak Company (http://wwwjp.kodak.com/JP/ja/business/products/network/sca nStation100.shtml) is the ADF type network scanner and is equipped with a small numerical keypad and a touch panel as input devices and a small display as a display device.

However, the advantage of compactness of input and output devices of the network scanner generally clashes with the enhancement of input operability and display ability while using them. In other words, in conventional network scanners, when the input and output devices attached to the network scanner are made compact to enable flexibility in the place of installation of the network scanner, there is a tradeoff in the ease of operation of the input device and poor visibility on the display.

For example, as in the ADF type network scanner (such as the Scan Station 100), when the installation area of the scanner device is reduced to enable flexibility in the place of installation of the scanner device itself, by making the input and output devices compact, this leads to loss of convenience for the users, when they use the scanner device.

Specifically, when the display device disclosed in JP-A-5-204585 is integrated with the network scanner device, the compactness is lost due to integration.

As in the JP-A-5-204585, when the network scanner device is made connectable to the display and the keyboard, this will result in increased installation area.

SUMMARY OF THE INVENTION

It is an object of the present invention to at least partially solve the problems in the conventional technology.

A scanner device according to one aspect of the present invention includes a keyboard, a display, a control unit, and a storage unit, wherein the keyboard and the display are disposed so as to cover the top of the body of the scanner device, and the control unit includes an image reading unit that controls to read image data from original documents, an image storing unit that stores the image data read by the image reading unit in the storage unit, and a display control unit that controls to display the image data of any of the original documents on the display based on the image data stored by the image storing unit.

An image reading and display method according to another aspect of the present invention is executed by a scanner device that includes a keyboard, a display, a control unit, and a storage unit, wherein the keyboard and the display are disposed so as to cover the top of the body of the scanner device, and the method includes an image reading step of controlling to read image data from original documents, an image storing step of storing the image data read at the image reading step in the storage unit, and a display control step of controlling to display the image data of any of the original documents on the display based on the image data stored at the image storing step, wherein the steps are executed by the control unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
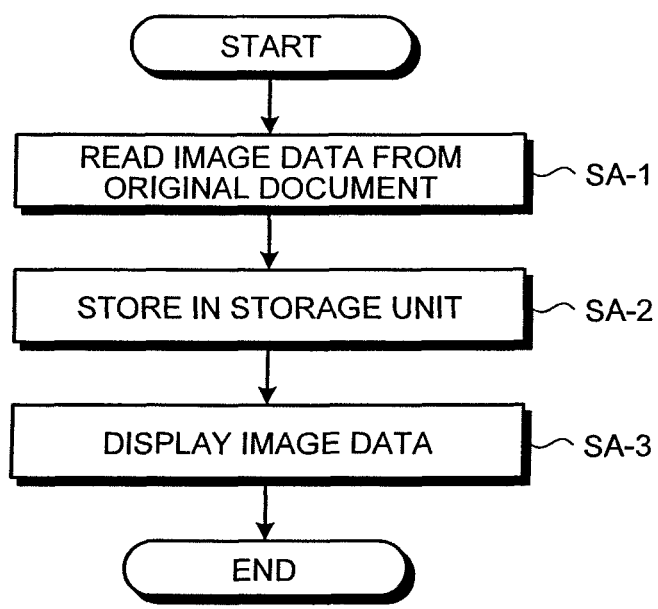
FIG. 1 is a flowchart indicating the basic principle of the present invention.

Exemplary embodiments of the scanner device according to the present invention are described below in detail with reference to the accompanying drawings. The embodiments are not to be thus limited.

Overview of the Invention

An overview of the scanner device according to the present invention is described first, followed by detail description of its structure and its processes.

The basic feature of the scanner device according to the present invention is that it includes at least a keyboard, a display, a control unit, and a storage unit. The scanner device according to the present invention has the keyboard and the display that are disposed so as to cover the top of the body of the scanner device. The display has resolutions of equal to or more than 1024×768 pixels. The keyboard can be a full keyboard. The scanner device can be an automatic document feeder (ADF) type or a flatbed (FB) type scanner device.

"Full keyboard" refers to a keyboard having character input keys, each of which is assigned a single character such as alphabet. For example, there are 101, 104, 106, 107, 109, 112, or 113 keys on a full keyboard stipulated in Japanese Industrial Standard (JIS) and other standards. The keyboard can also include a numerical keypad. The display preferably has a display area of equal to or more than 8.4 inches. The display can include a touch panel.

The scanner device controls to read image data from original documents (step SA-1).

The scanner device then stores the read image data in the storage unit (step SA-2).

The scanner device then controls to display the image data of any original document on the display based on the image data stored in the storage unit (step SA-3). The scanner device can exert control to display the plurality of image data stored in the storage unit as thumbnail images.

The scanner device can also be configured to exert control to assign page numbers to the plurality of the image data in the sequence in which the original documents are read, and store the image data as any files in the storage unit, with each of the files having the image data that are read sequentially and assigned page numbers consecutively. The scanner device can also be configured to display current file size and the total size of the all the files.

When the scanner device is configured as described above, the scanner device can be configured to control the display to enable the user to input instructions to delete the image data, change the page numbers, or merge the files, etc. Also, when there is the instruction input by the user to delete an image data, the scanner device can be configured to exert control to delete the image data, or when there is the instruction input by the user to change the page numbers, the scanner can change the page numbers, or when there is the instruction input by the user to merge the files, the scanner can merge the files.

When the scanner device reads new image data from an original document to be added to the files, the scanner device can assign the page numbers that are following page numbers of the last page number in the files to the image data, add the image data to the files, and stores the image data in the storage unit.

The scanner device can be configured to control the display so that the user can input instructions pertaining to the image data such as enlarge, reduce, rotate, and move, and to perform image processing on the image data in accordance with the corresponding instruction, when the user input the above instructions.

The scanner device can be configured to exert controls the display such that the user can input the instructions such as change page number, merge files, delete image data, enlarge, reduce, rotate, and move, by dragging operation.

The scanner device can be configured to recognize characters, symbols, or drawings from the image data and retrieve character including data, and control to display the retrieved character including data and to enable the user to edit the characters, symbols, and drawings.

Configuration of the Scanner Device

FIGS. 2 to 8 are drawings of a scanner device 100 according to the present invention.

Figure 2:
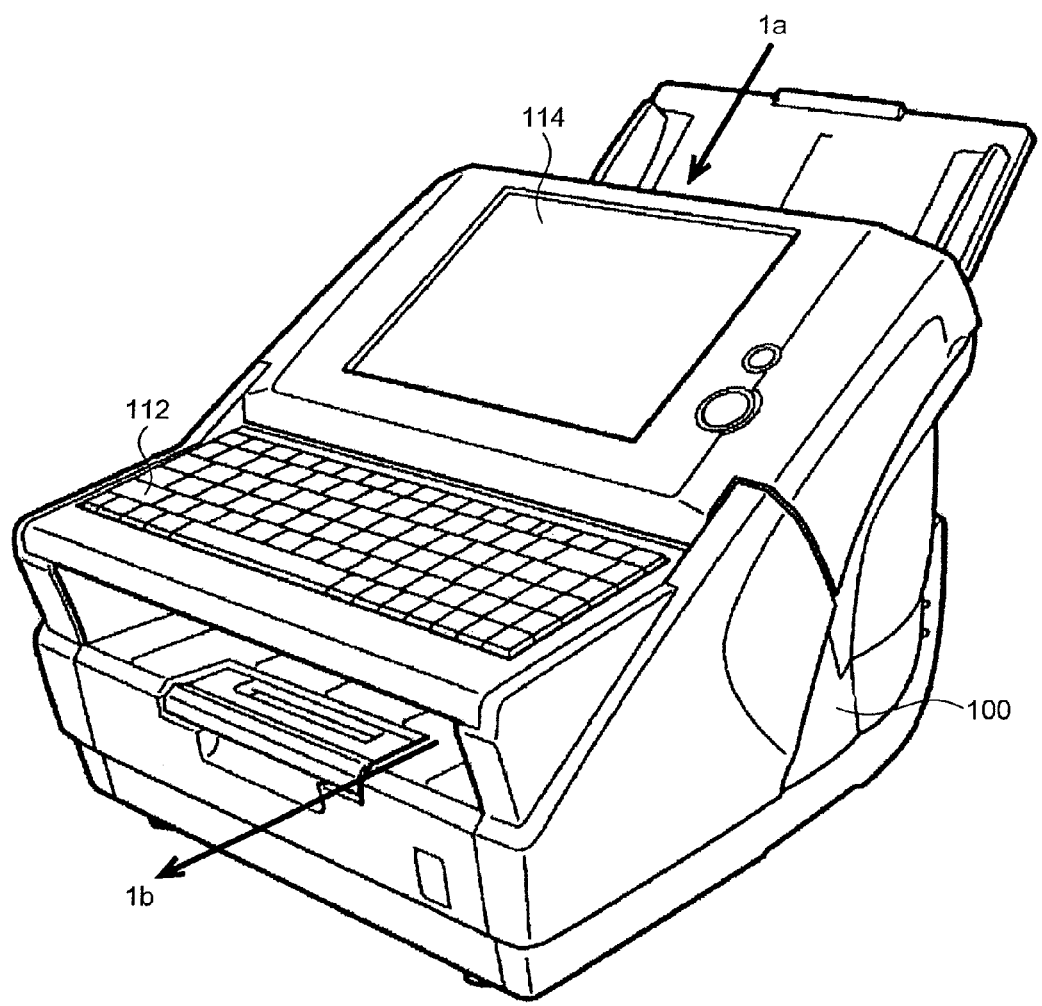
FIG. 2 is a drawing of a scanner device 100 according to an embodiment of the present invention.

As shown in FIG. 2, the top of the body of the scanner device 100 is covered by the display 114 and a keyboard 112. The display 114 can be equipped with a touch panel as shown in FIG. 2.

Placing the display 114 and the keyboard 112 so as cover the top of the body of the scanner device 100 enables a large display and a full keyboard to be provided without having to increase the installation area of the scanner device 100, and ensures user convenience.

The scanner device 100 is configured in such a way that the display 114 covers the top of a sheet feeding unit 1a and the keyboard 112 covers the top of a sheet discharging unit 1b. However, this structure would pose a problem should there be jamming of sheet necessitating manual operation of the sheet feeding unit 1a or the sheet discharging unit 1b. As a solution to the problem, the scanner device 100 includes a shaft provided towards the front of the body and that extends horizontally. The shaft allows the display 114 and the keyboard 112 to be rotated at fixed angles. The shaft is explained below in detail with reference to FIGS. 3 to 8.

Figure 3:
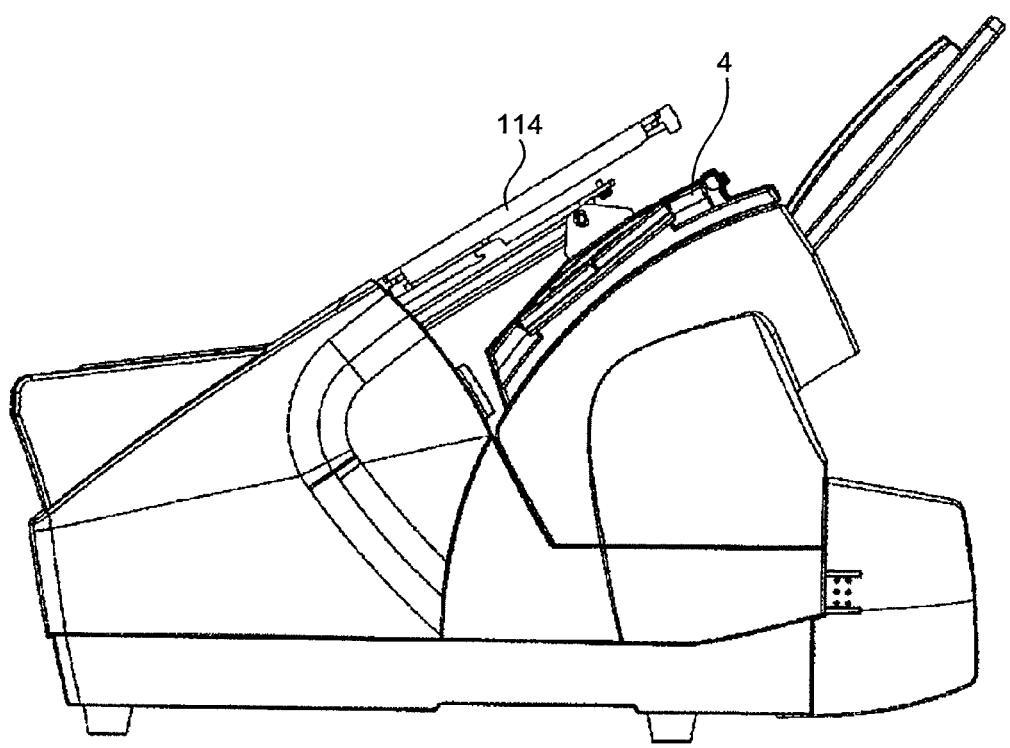
FIG. 3 is an explanation drawing of the scanner device 100 showing a display 114 covering an ADF cover.

When the sheet gets jammed during sheet feeding, an ADF cover 4 needs to be opened to free the jammed sheet. As shown in FIG. 3, as the display 114 covers the area above the sheet feeding unit 1a, the display 114 needs to be pulled up to be able to open the ADF cover 4. Similarly, the ADF cover 4 will need to be closed before pushing down the display 114 to its original position. Thus, removal of a jammed sheet would entail a whole lot of opening and closing.

Figure 4:
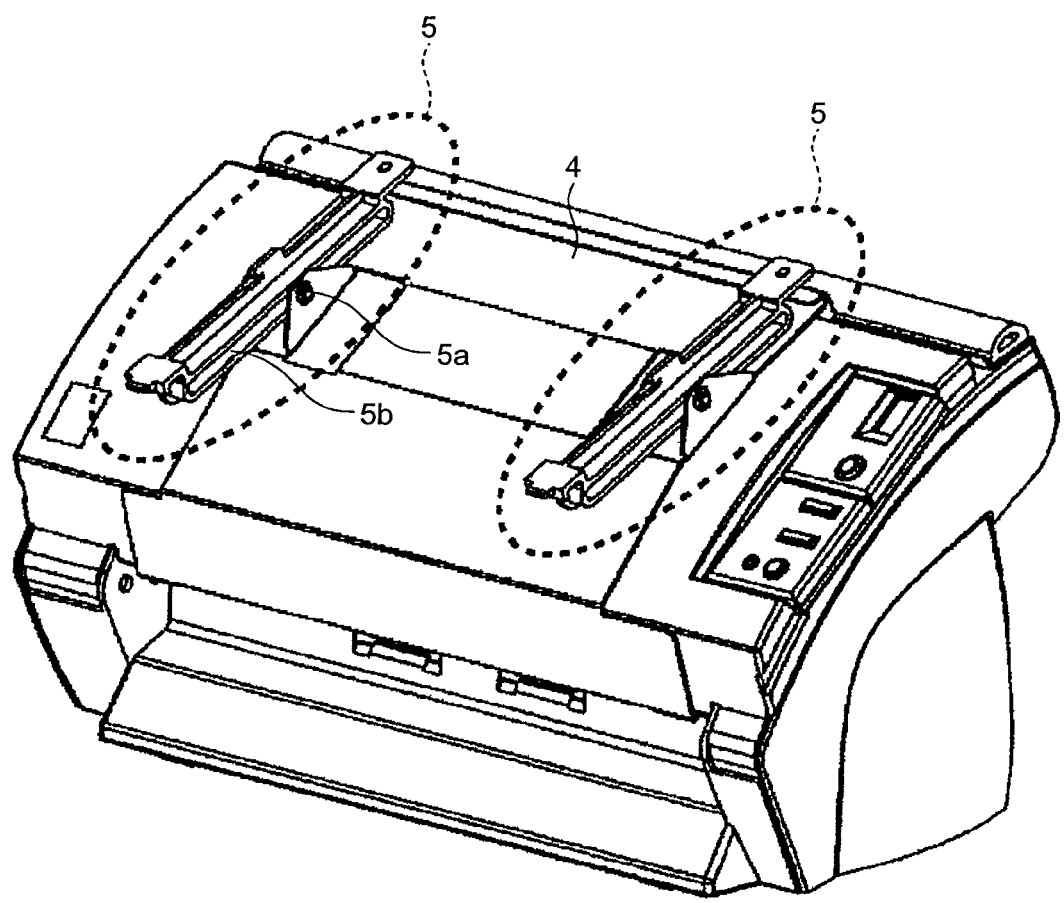
FIG. 4 is a schematic of an opening and closing mechanism of the ADF cover.

As shown in FIG. 4, the scanner device 100 includes an ADF cover opening and closing mechanism 5 on the backside of the display 114. In other words, the ADF cover opening and closing mechanism 5 includes a guide rail 5b that fastens the backside of the display 114, and an ADF cover fixture 5a that fastens the upside of the ADF cover 4, and the ADF cover fixture 5a and the ADF cover 4 are interlocked so as to be slidable in the rail direction of the guide rail 5b.

Figure 5A:
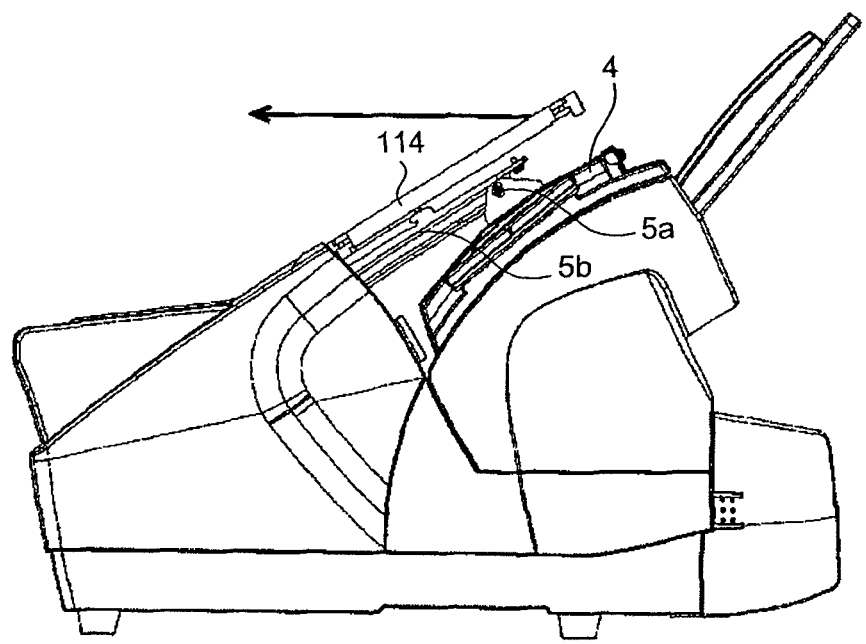
FIGS. 5A and 5B are schematics for explaining the action of the opening and closing mechanism of the ADF cover.
Figure 5B:
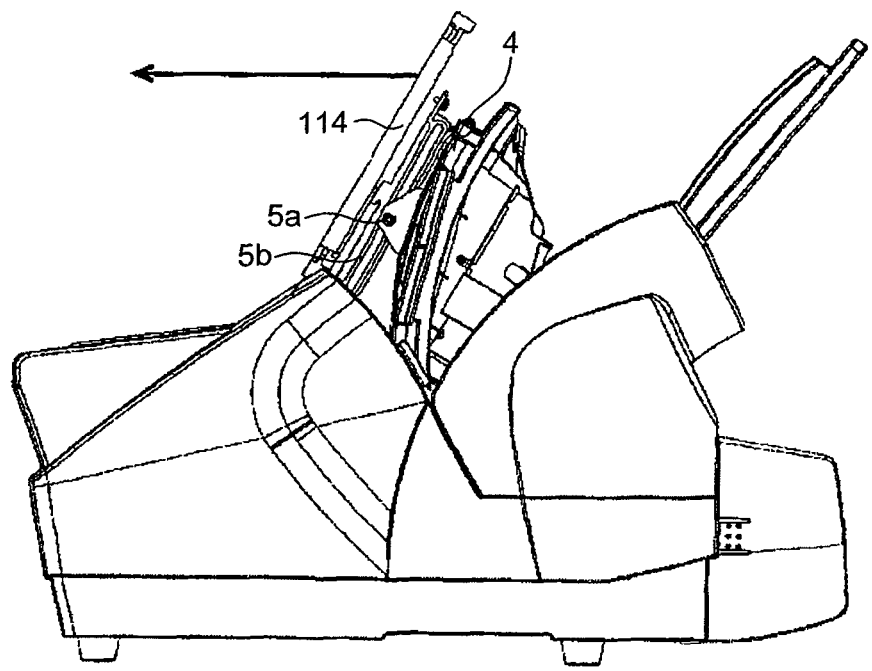
Figure 6:
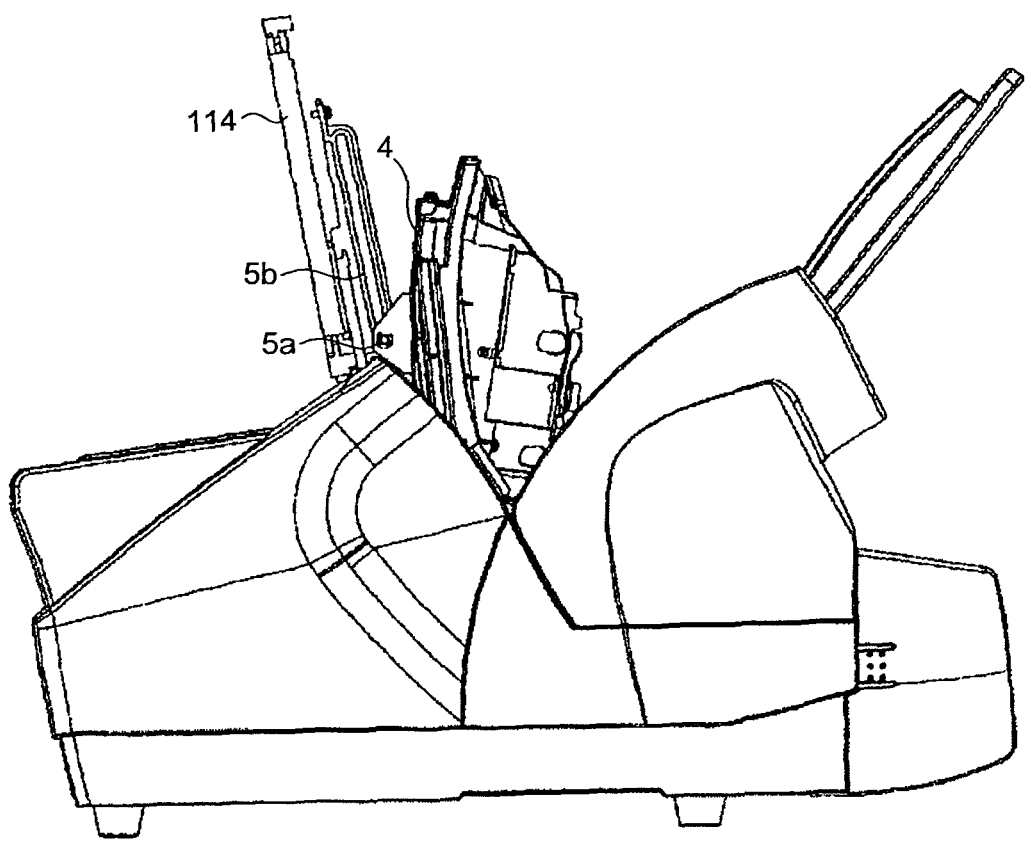
FIG. 6 is a schematic for explaining the action of the opening and closing mechanism of the ADF cover.

Thus, when the user pulls up the display 114 in the direction of the arrow shown in FIG. 5A, the ADF cover 4 also gets pulled up along with the display 114 because of the ADF cover opening and closing mechanism 5 that interlinks the backside of the display 114 and the ADF cover 4. An interlocking member of the ADF cover fixture 5a that interlocks with the guide rail 5b moving smoothly along the rail, resolves any physical conflict arising due to the rotation shaft of the display 114 and the rotation shaft of the ADF cover 4 not matching. In other words, the user needs only to pull up the display 114 to have the ADF cover 4 completely open as shown in FIG. 6.

Thus, the ADF cover opening and closing mechanism 5 facilitates opening or closing of the ADF cover 4 by a user action of pulling up or pushing down of the display 114. Consequently, when the inside of the scanner device 100 has to be accessed for maintenance such as when a sheet gets jammed, it can be easily accomplished by just pulling up the display 114.

Original documents, after being scanned, are ejected into the sheet discharging unit 1*b*. However, when credit cards or visiting cards that are small in size, it would be difficult to retrieve them from the sheet discharging unit 1*b* because it has the keyboard 112 over it.

Figure 7:
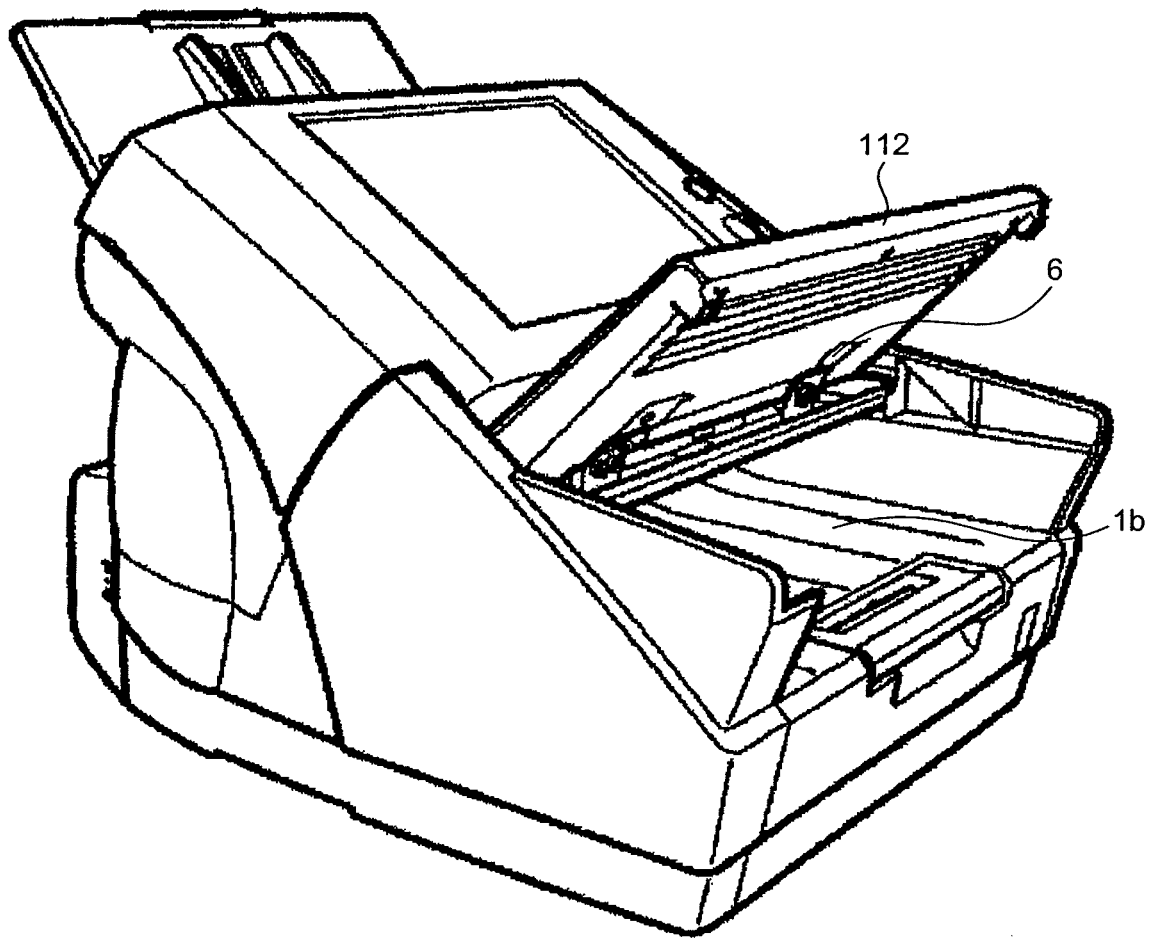
FIG. 7 is a schematic for explaining a keyboard popping mechanism.
Figure 8:
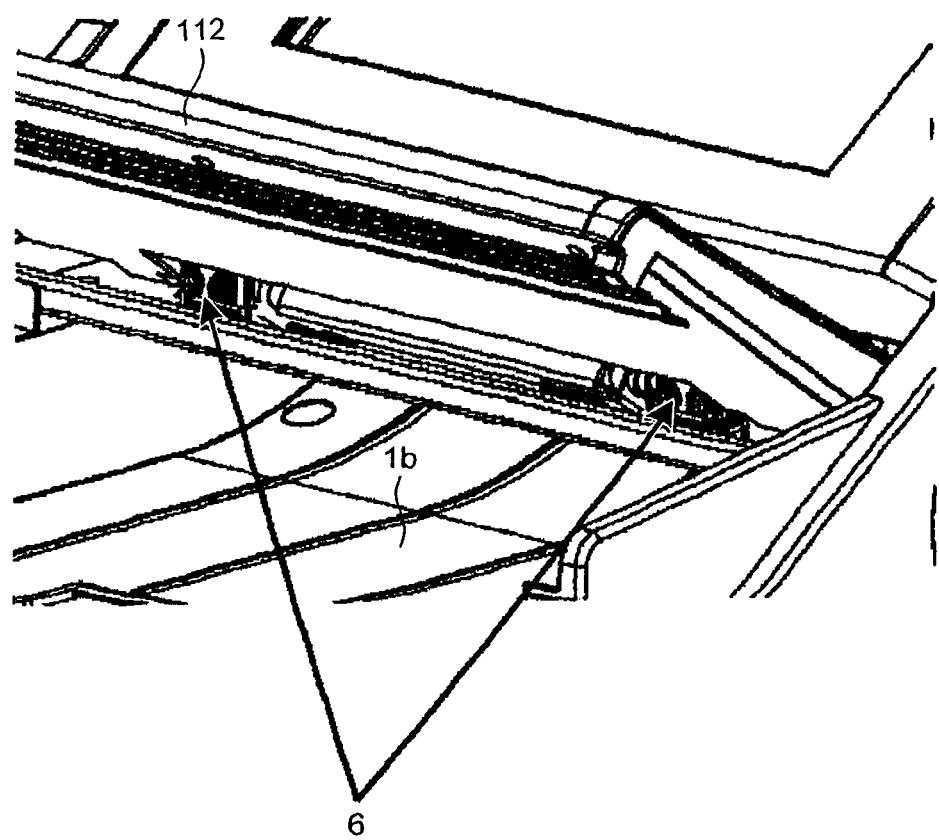
FIG. 8 is a schematic for explaining the keyboard popping mechanism.

Therefore, as shown in FIG. 7, at the portion where the rear edge of the keyboard 112 is attached to the body of the scanner device, the scanner device 100 is provided with a shaft that serves as a rotation support. This allows the keyboard 112 to be lifted up from the front edge. As shown in FIGS. 7 and 8, a flip-up mechanism 6 provided adjacent to the rotation shaft serves to assist the user to lift up the keyboard with less force, facilitating easy access for maintenance purposes.

Thus, when small size original documents such as credit cards and visiting cards after being scanned are ejected into the sheet discharging unit 1*b* beneath the keyboard 112, the user can be easily retrieved by lifting up the keyboard 112.

The logical structure of the scanner device 100 is described below with FIG. 9. Only parts relevant to the present invention are shown schematically in FIG. 9. The scanner device 100 includes at least the keyboard 112, the display 114, a control unit 102, and a storage unit 106.

Figure 9:
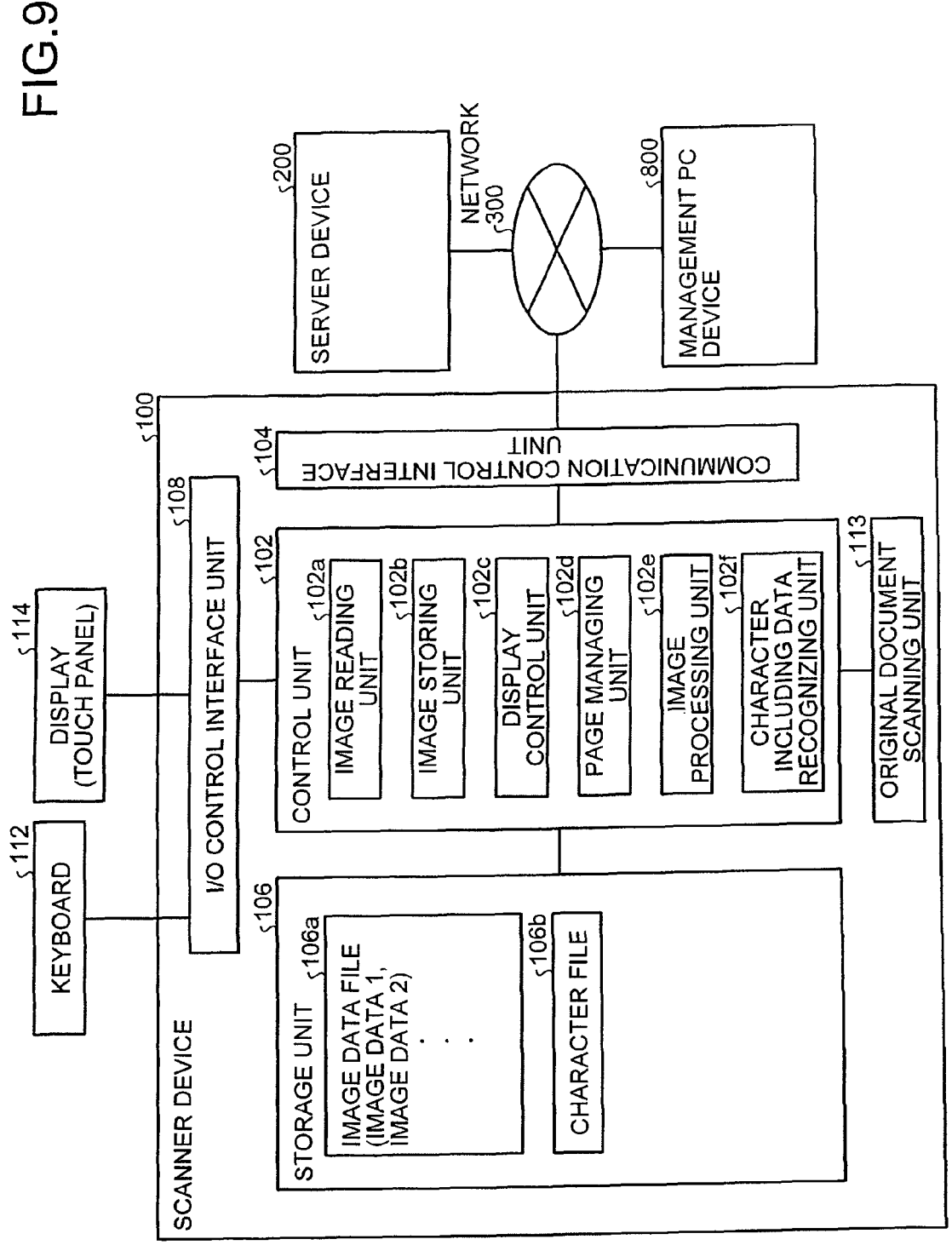
FIG. 9 is a block diagram of a logical structure of the scanner device 100 in which the present invention is applied.

As shown in FIG. 9, a network 300 connects the scanner device 100, a server device 200, and a management PC device 800 with one another. The network 300 can be the Internet, an intranet or a telephone line network etc.

The server device 200 is connected to the scanner device 100 with one another via the network 300, and has the function of sending electronic mails with image to other mail server device and receiving the mails from the server device.

The server device 200 can also be configured as an authentication server device, mail server device, fax server device, print server device, or network shared folder device. Alternatively, the server device 200 can also be configured as a web server or active server pages (ASP) server, having a hardware configuration of an information processing device such as a common workstation or personal computer and its peripheral devices. The each of the functions of the server device 200 are implemented by the hardware components of the server device 200 such as the central processing unit (CPU), disk device, memory device, input device, output device, and communication control device, and, programs that control these components.

The management PC device 800 performs management and maintenance of the scanner device 100 by remote operation. The management PC device 800 is an information processing device such as a common personal computer, and controls to display user interface (such as web contents) provided by the network scanner device 100. The each of the functions of the management PC device 800 are implemented by the hardware components of the management PC device 800 such as the CPU, disk device, memory device, input device, output device, and communication control device, and, programs that control these components.

The scanner device 100 includes the control unit 102 that controls the CPU that centrally controls the scanner device 100, a communication control interface unit 104 that connects the scanner device to a communication device (not shown) such as a router connected to a communication channel, an input/output (I/O) control interface unit 108 that connected to the keyboard 112 and the display 114, an original document scanning unit 113, and the storage unit 106 that stores therein various databases and tables. The control unit 102, the communication control interface unit 104, the I/O control interface unit 108, and the storage unit are communicably connected to one another by some communication channel. The scanner device 100 is communicably connected to the network 300 by a communication device such as a router and by a wireless communication channel or a dedicated hard-wired communication channel.

The storage unit 106 is a fixed disk device and stores therein various databases and tables (image data file 106*a* and character file 106*b*), and store for example, various programs, tables, files, databases, and web pages required for various processes.

The image data file 106*a* stores image data read from the original documents by controlling the original document scanning unit 113.

The character file 106*b* stores character including data that has characters, symbols, or diagrams from the scanned image data.

The communication control interface unit 104 controls communication between the scanner device 100 and the network 300 (or any communication device like a router). In other words, the communication control interface unit 104 helps the scanner device 100 exchange data with another terminal via a communication channel.

The original document scanning unit 113 is controlled by the control unit 102 to read the image from the original documents, and includes all the mechanisms in the physical structure described above, from the sheet feeding unit 1*a* to the sheet discharging unit 1*b*.

The I/O control interface unit 108 is connected to the keyboard 112 and the display 114, and controls them. The keyboard in the present embodiment is a full keyboard, such as there are 101, 104, 106, 107, 109, 112, or 113 keys on a full keyboard stipulated in Japanese Industrial Standard (JIS) and other standards. The keyboard 112 can also include a numerical keypad. The display 114 should preferably have a display area of equal to or more than 8.4 inches. The display 114 can include a touch panel.

The control unit 102 includes an internal memory for storing control programs such as the operating system (OS), computer programs and data required for implementing process procedures, and performs data processing for implementing various processes through the computer programs. The control unit 102 functionally and conceptually includes an image reading unit 102*a*, an image storing unit 102*b*, a display control unit 102*c*, a page managing unit 102*d*, an image processing unit 102*e*, and a character recognizing unit 102*f*.

The image reading unit 102*a* controls the original document scanning unit 113 to read the image data from the original document.

The image storing unit 102*b* stores the image data read by the image reading unit 102*a* in the image data file 106*a*.

The display control unit 102*c* controls to display the image data of any original document on the display 114 based on the image data stored by the image storing unit 102*b*. The display control unit 102*c* can be configured to exert control to display on the display 114 thumbnail images of the plurality of image data stored in the image data file 106*a*. The display control unit 102*c* can be configured to exert control the display 114 such that the user can input instructions such as change page numbers, merge files, delete image data, enlarge, reduce, rotate, and move by dragging operation.

The page managing unit 102d assigns page numbers to the plurality of image data in the sequence in which the image reading unit 102a reads the original documents, and exerts control such that image data that are read by a sequence of reading action and that are assigned consecutive page numbers are stored as any file in the image data file 106a. The page managing unit 102d can be configured to control the display 114 upon receiving instruction from the display control unit 102c such that the user can input instructions pertaining to the image data such as delete, change page number, or merge files, and to perform the various processes according to the instructions. When an image data of the original document that is to added to an existing file is read by the image reading unit 102a, the page managing unit 102d can be configured to assign the page number following the last page number of the concerned file to the image data, add the image data to the file, and store the image data in the image data file 106a.

The image processing unit 102e performs image processing on an image data stored in the image data file 106a according to the instruction input by the user via the display 114 controlled by the display control unit 102c to accept instructions such as enlarge, reduce, rotate, or move by the user.

The character recognizing unit 102f recognizes characters, symbols, or diagrams from the image data stored in the image data file 106a, and retrieves the character including data. The character recognizing unit 102f can be configured to display the character including data on the display 114 upon receiving instruction from the display control unit 102c such that the user can edit the characters, symbols, or diagrams. The character recognizing unit 102f can also be configured to store the retrieved character including data in the character file 106b.

Process of the Scanner Device

The processes performed by the scanner device according to the embodiment are described below in detail with reference to FIGS. 10 to 13.

Page Management Process

Figure 10:
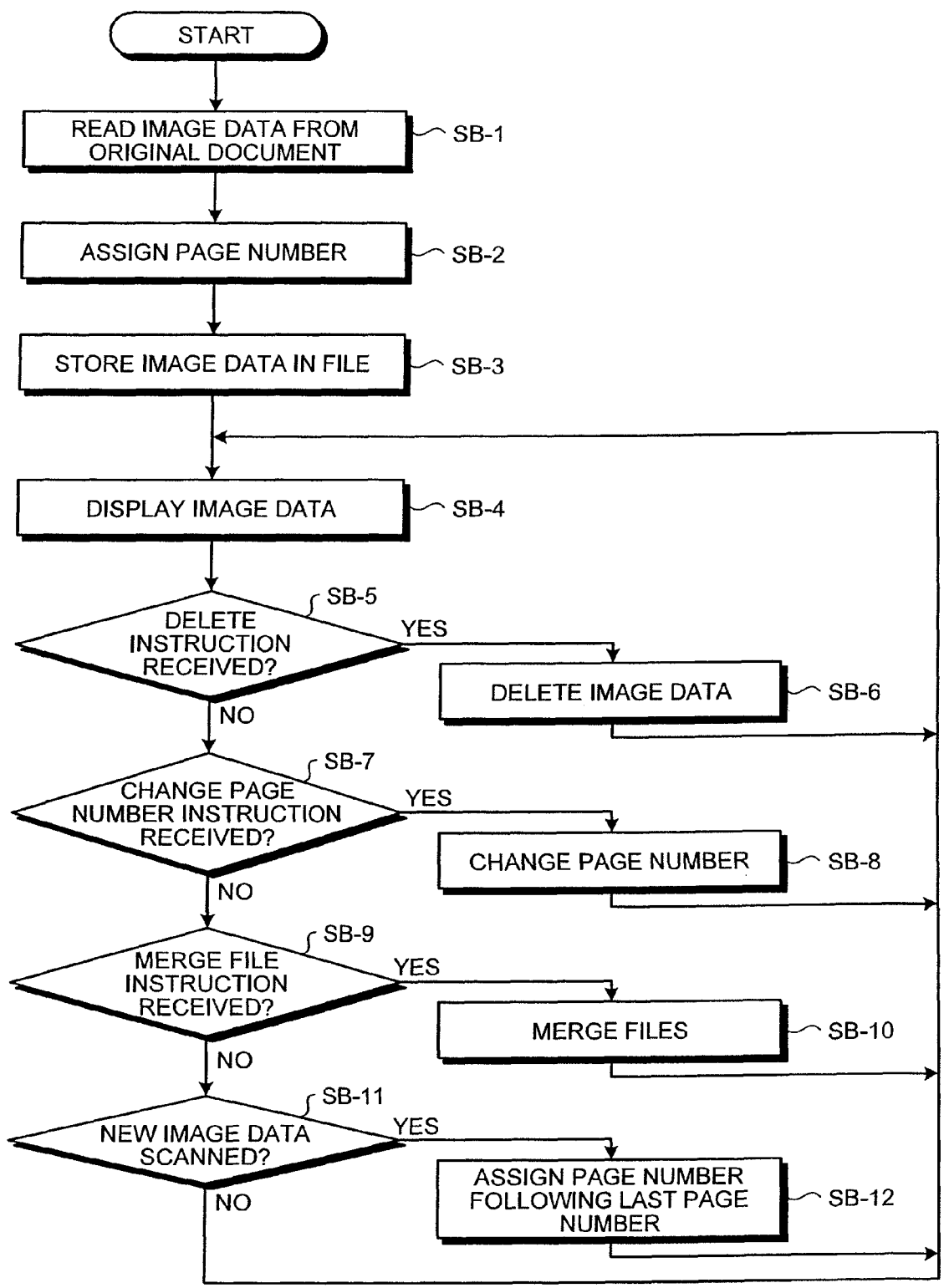
FIG. 10 is a flowchart of a page management process performed by the scanner device 100 according to the embodiment.
Figure 11:
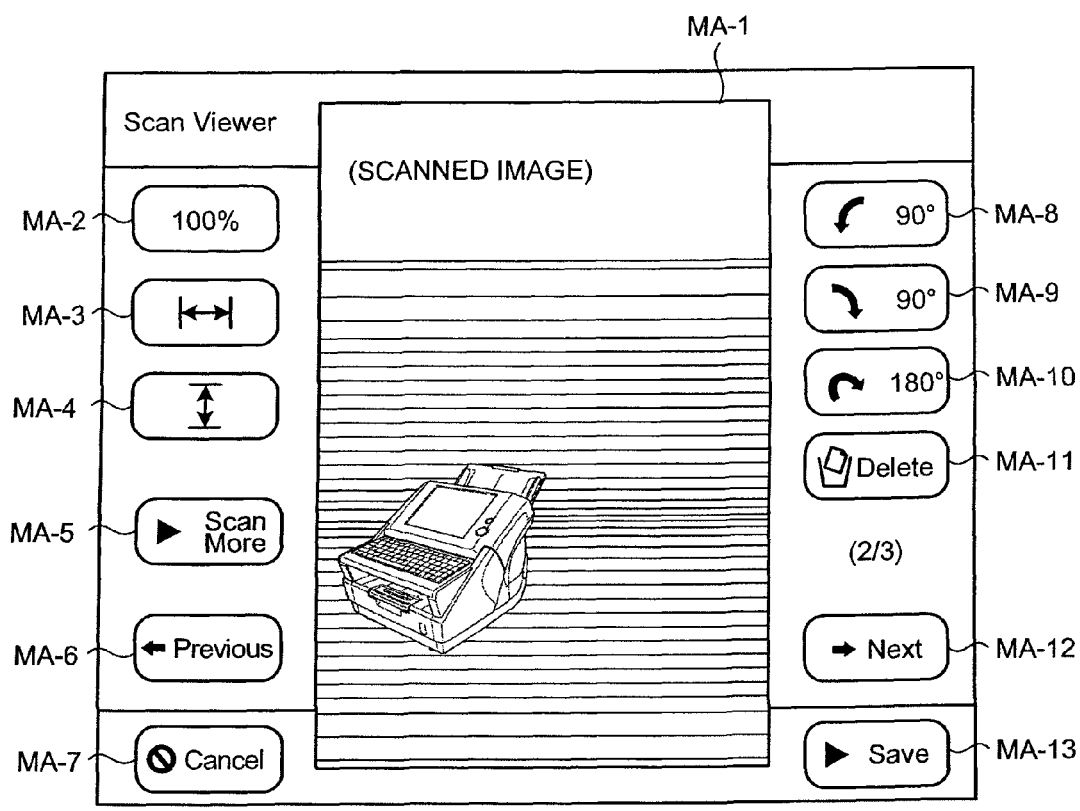
FIG. 11 is a drawing showing an example of a scanned image confirmation and editing process screen of the scanner device 100.
Figure 12:
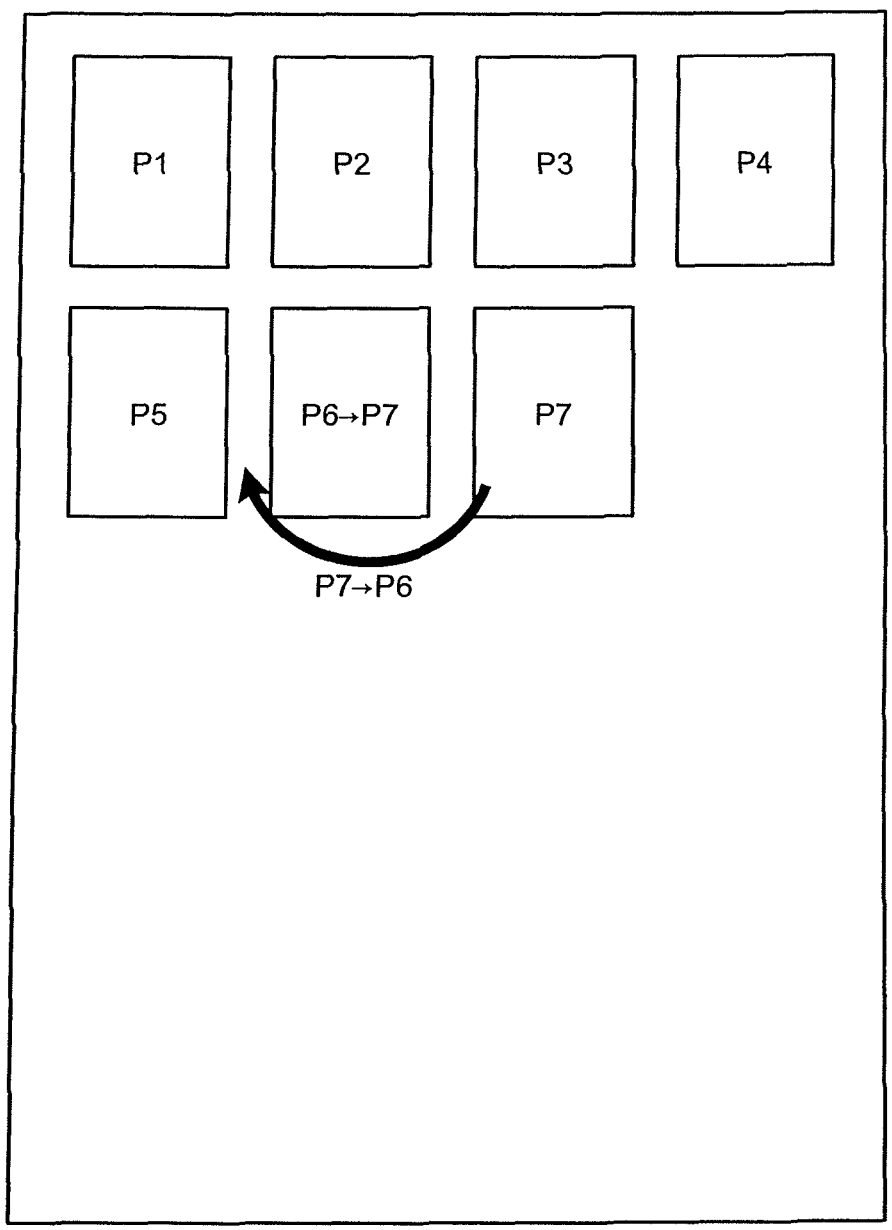
FIG. 12 is a drawing showing an example of the scanned image confirmation and editing process screen of the scanner device 100 with a plurality of images displayed in list form.

A page management process is described first with reference to FIGS. 10 to 12.

As shown in FIG. 10, the image reading unit 102a controls the original document scanning unit 113 to scan the image data from the original document (step SB-1).

The page managing unit 102d assigns page numbers to the plurality of image data read by the image reading unit 102a sequentially in the order in which the original documents are read (step SB-2).

The image storing unit 102b stores the image data read by the image reading unit 102a in the image data file 106a (step SB-3). The image storing unit 102b can be configured to store the plurality of image data in the image data file 106a. The image data are read by a sequence of reading action of the image reading unit 102a and the page managing unit 102d, and that are assigned consecutive page numbers as any file of the image data.

The display control unit 102c exerts control such that the image data of any original document is displayed on the display 114 based on the image data stored by the image storing unit 102b (step SB-4). As shown in FIG. 12, the display control unit 102c can be configured to exert control such that image data stored in the image data file 106a are displayed as thumbnail images on the display 114.

The scanned image confirmation and editing process screen shown in FIG. 11 includes a preview area MA-1, a Show actual size button MA-2, a Fit horizontally button MA-3, a Fit vertically button MA-4, a Scan more button MA-5, a Show previous screen button MA-6, a Cancel button MA-7, a Rotate 90° counter-clockwise button MA-8, a Rotate 90° clockwise button MA-9, a Rotate 180° button MA-10, a Delete image button MA-11, a Show next screen button MA-12, and a Save image data button MA-13.

The preview area MA-1 is where the current image data is displayed by the display control unit 102c. The user can press the Show actual size button MA-2 to view the image data in its actual size. By pressing the Fit horizontally button MA-3, the user can fit the image data in the preview area MA-1 horizontally. Likewise, by pressing the Fit vertically button MA-4, the user can fit the image data in the preview area MA-1 vertically. By pressing the Scan more button MA-5, the user can cause the image reading unit 102a to control the original document scanning unit 113 to scan additional image data. By pressing the Show previous screen button MA-6, the user can view the image data previous to the current image data displayed in the preview area MA-1, when there is a plurality of image data read by the image reading unit 102a. Similarly, by pressing the Show next screen button MA-12, the user can view the image data next to the current image data displayed in the preview area MA-1. By pressing the Rotate 90° counter-clockwise button MA-8, the user can view the image data rotated 90° counter-clockwise. Similarly, by pressing the Rotate 90° clockwise button MA-9, the user can view the image data rotated 90° clockwise. Likewise, by pressing the Rotate 180° button MA-10, the user can rotate the image data by 180°. By pressing the Cancel button MA-7, the user can cancel reading, editing, or other processes being carried out on the image data. By pressing the Delete image button MA-11, the user can delete the image data currently displayed in the preview area MA-1. By pressing the Save image data button MA-13, the user can save in the image data file 106a the image data in which the editing processes described above have been reflected.

Returning to FIG. 10, if the user inputs a delete instruction (Yes at step SB-5), the page managing unit 102d deletes the concerned image data (step SB-6). In other words, if the user presses the Delete image button MA-11, the page managing unit 102d selects and deletes the image data displayed in the preview area MA-1. If there is a plurality of scanned image data, the user can press the Show previous screen MA-6 or Show next screen MA-12 to select the desired image data and delete the selected image data by pressing the Delete image button MA-11. The display control unit 102c can display the image data on the display 114 in the form of thumbnails, as shown in FIG. 12, and the user can select the image data to be deleted by clicking its thumbnail and press the Delete image button MA-11 to delete the image data. After the image data is deleted, the display control unit 102c displays in the preview area MA-1 the thumbnail images of all the image data except the one that is deleted (step SB-4). When no delete instruction is input by the user (No at step SB-5), the scanner device proceeds to the process described below.

When the user inputs a change page number instruction (Yes at step SB-7), the page managing unit 102d exerts control to change the concerned page number (step SB-8). In other words, as shown in FIG. 12, if the user drags and drops the thumbnail image of page 7 after page 5 in the preview area MA-1, the page managing unit 102d, reassigns the shifted page as 6 and what was originally page number 6 as page 7. After the page numbers are reassigned, the display control unit 102c displays in the preview area MA-1 the thumbnails of the image data with changed page numbers (step SB-4).

When no change page number instruction is input by the user (no at step SB-7), the scanner device proceeds to the process described below.

When the user inputs a merge files instruction (Yes at step SB-9), the page managing unit 102d exerts control to merge the concerned files (step SB-10). For example, when the user a two-page file A, and a three-page file B, and inputs an instruction (not shown) to create one file by merging file A and file B, the page managing unit 102d assigns page numbers to the pages in file B so that they form consecutive numbers with the pages in file A, and merges the two files to form a five-page file C. After the files are merged, the display control unit 102c displays the merged image data in the preview area MA-1 (step SB-4). When no merge files instruction is input by the user (no at step SB-9), the scanner device proceeds to the process described below.

When an additional image data is scanned to be added to an existing file (Yes at step SB-11), the page managing unit 102d assigns to the image data the page number following the last page number in the concerned file (step SB-12). In other words, when the user operates the Scan more button MA-5 to control the original document scanning unit 113 by the process performed by the image reading unit 102a to read additional image data, the page managing unit 102d assigns to the image data the page number following the last page number in the file. The page managing unit 102d can add the image data to the file, to be added to the image data file 106a by the process performed by the image storing unit 102b. After the image data is added to the file, the display control unit 102c displays the added image data in the preview area MA-1 (step SB-4). When no scan more instruction is received from the user (No at step SB-11, the scanner device returns to image data display process (step SB-4).

Each of the processes described above can be cancelled by the user by pressing the Cancel button MA-7. Alternatively, the image data with the changes reflected on them after the editing process can be saved in the image data file 106a by the user by pressing the Save image data button MA-13. The display control unit 102c can exert control such that the user can input instructions (which in the description is done by pressing the various buttons) by dragging operation using input units such as a mouse or a touch panel.

Image Processing

Image processing is described below in detail with reference to FIGS. 11 and 13.

Figure 13:
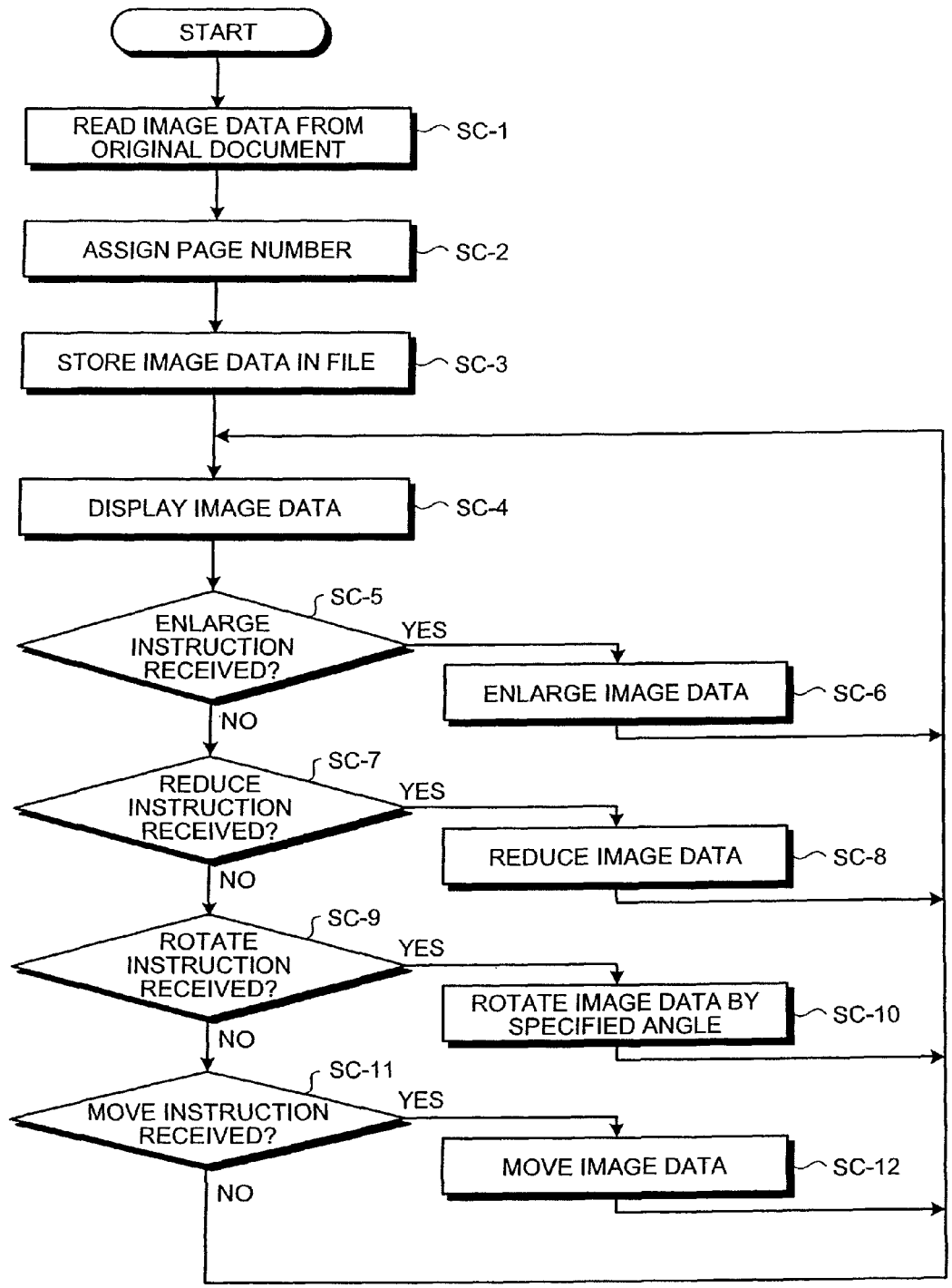
FIG. 13 is a flowchart of an image processing performed by the scanner device 100 according to the present embodiment.

The steps SC-1 to SC-4 in FIG. 13 correspond respectively to the steps SB-1 to SB-4 in FIG. 10 and hence the description thereof is omitted.

When the user inputs an enlarge instruction (Yes at step SC-5), the image processing unit 102e performs image processing to enlarge the concerned image data (step SC-6). In other words, when the user performs an operation to indicate that the image data being displayed in the preview area MA-1 shown in FIG. 11 be enlarged (not shown), the image processing unit 102e performs image processing to enlarge the image data displayed in the preview area MA-1. After the image data is enlarged, the display control unit 102c displays the enlarged image data in the preview area MA-1 (step SC-4). When no enlarge instruction is input by the user (No at step SC-5), the scanner device proceeds to the process described below.

When the user inputs a reduce instruction (Yes at step SC-7), the image processing unit 102e performs image processing to reduce the concerned image data (step SC-8). In other words, when the user performs an operation to indicate that the image data being displayed in the preview area MA-1 shown in FIG. 11 be reduced (not shown), the image processing unit 102e performs image processing to reduce the image data displayed in the preview area MA-1. After the image data is reduced, the display control unit 102c displays the reduced image data in the preview area MA-1 (step SC-4). When no reduce instruction is input by the user (No at step SC-7), the scanner device proceeds to the process described below.

When the user inputs a rotate instruction (Yes at step SC-9), the image processing unit 102e performs image processing to rotate the concerned image data (step SC-10). In other words, when the user presses the Rotate 90° counter-clockwise button MA-8 as shown in FIG. 11, the image processing unit 102e rotates the image data displayed in the preview area MA-1 counter-clockwise by 90°. Similarly, when the user presses the Rotate 90° clockwise button MA-9, the image processing unit 102e rotates the image data displayed in the preview area MA-1 clockwise by 90°. Likewise, when the user presses the Rotate 180° button MA-10, the image processing unit 102e rotates the image data displayed in the preview area MA-1 by 180°. After the image data is rotated by the specified angle, the display control unit 102c displays the rotated image data in the preview area MA-1 (step SC-4). When no rotate instruction is input by the user (No at step SC-9), the scanner device proceeds to the process described below.

When the user inputs a move instruction (Yes at step SC-11), the image processing unit 102e performs image processing to move the concerned image data (step SC-12). For example, the image processing unit 102e can perform image processing to move the image data when the user inputs a move instruction by dragging operation by a process of the display control unit 102c. After the image data is moved, the display control unit 102c controls to display the image data in its new position in the preview area MA-1 (step SC-4). If no move instruction is input by the user (No at step SC-11), the scanner device returns to image data display process (step SC-4).

Although not shown, the character recognizing unit 102f recognizes characters, symbols, and diagrams from the image data stored in the image data file 106a, and retrieves the character including data. The character recognizing unit 102f can be configured to display the character including data on the display 114 upon receiving instruction from the display control unit 102c such that the user can edit the characters, symbols, or diagrams. The character recognizing unit 102f can also be configured to store the retrieved character including data in the character file 106b. Storing character including data in the character file 106b enables image data to be searched using keywords.

Each of the processes described above can be cancelled by the user by pressing the Cancel button MA-7 as shown in FIG. 11. Alternatively, the image data with the changes reflected on them after the editing process can be saved in the image data file 106a by the user by pressing the Save image data button MA-13. The display control unit 102c can exert control such that the user can input instructions (such as enlarge, reduce, rotate, and move, which in the description is done by pressing the various buttons) by dragging operation using input units such as a mouse or a touch panel.

Other Embodiments

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

For example, in the embodiment, the scanner device 100 performs various processes a stand-alone device. However, the scanner device 100 can be configured to perform processes in response to request from a client terminal, which is a separate unit, and return the process results to the client terminal.

All the automatic processes explained in the present embodiment can be, entirely or in part, carried out manually. Similarly, all the manual processes explained in the present embodiment can be, entirely or in part, carried out automatically by a known method.

The process procedures, the control procedures, specific names, data, including various parameters, display example, mentioned in the description and drawings can be changed as required unless otherwise specified.

The constituent elements of the scanner device 100 are merely conceptual and may not necessarily physically resemble the structures shown in the drawings. For instance, the apparatus need not necessarily have the structure that is illustrated.

For example, the process functions performed by the apparatus can be entirely or partially realized by a central processing unit (CPU) or a computer program executed by the CPU or by a hardware using wired logic. The computer program, recorded on a recording medium, can be mechanically read by the scanner device 100 as the situation demands. In other words, the computer program recorded on the recording medium can cause the storage unit 106 such as read-only memory (ROM) or hard disk (HD) to work in coordination with the operating system (OS) to issue commands to the CPU and cause the CPU to perform various processes. The computer program is first loaded to the random access memory (RAM), and forms a control unit in collaboration with the CPU.

Alternatively, the computer program can be stored in any application program server connected to the scanner device 100 via the network 300, and can be fully or partially loaded as the situation demands.

The computer-readable recording medium on which the computer program can be stored may be a portable type such as flexible disk, magneto optic (MO) disk, ROM, erasable programmable ROM (EPROM), electrically erasable programmable ROM (EEPROM), compact disk-read-only memory (CD-ROM), digital versatile disk (DVD), or a communication medium that stores the computer program for a short term such as communication channels or carrier waves that transmit the computer program over networks such as local area network (LAN), wide area network (WAN), and the Internet.

Computer program refers to a data processing method written in any computer language and can have software codes and binary codes in any format. The computer program can be a dispersed form in the form of a plurality of modules or libraries, or can perform various functions in collaboration with a different program such as the OS. Any known configuration in the scanner device according to the embodiment can be used for reading the recording medium. Similarly, any known process procedure for reading or installing the computer program can be used.

The storage unit 106 is a fixed disk device such as RAM, ROM, and hard disk or flexible disk, optical disk, and stores therein various programs, databases (image data file 106a and character file 106b), tables, and web pages required for various processes and opening websites.

The scanner device 100 can also be connected to any existing personal computer, workstation, etc. and can be operated by executing software (that includes computer program, data, etc.) that implements the method according to the present invention in the personal computer or workstation.

The distribution and integration of the device are not limited to those illustrated in the figures. The device as a whole or in parts can be functionally or physically distributed or integrated in an arbitrary unit according to various attachments or how the device is to be used.

According to the present invention, the compactness of the scanner device allows it to be installed anywhere. In addition, image processing and file management of the image data read by the scanner device can be carried out without compromised ease of operation and good visibility of displayed data on the display device. In other words, the scanner device according to the present invention achieves space-saving while being equipped with an input device in the form of a keyboard and an output device in the form of a large screen.

According to the present invention, enlarging, reducing, rotating, moving, or deleting image data can be carried out with a preview of the image being displayed on the display, allowing the user to edit the image data without having to use other terminals like a personal computer.

According to the present invention, page numbers are automatically assigned to the read image data, enabling the user to manage image data obtained from different original documents separately.

According to the present invention, a large display having a satisfactory resolution is provided, enabling the user to perform operations like changing page numbers, deleting, merging files, etc., from the thumbnail images of the image data displayed on the display of the scanner device itself, thus improving user-friendliness of the network scanner device.

According to the present invention, the scanner device can recognize characters from the image data by optical character recognition (OCR) technology, enabling the user to easily edit the image data with characters using the keyboard of the scanner device.

According to the present invention, a touch panel is provided in the display, providing the user with a further improved operability.

According to the present invention, a display with a display area of equal to or more than 8.4 inches is provided. Consequently, a cost-effective scanner with a satisfactory quality of display can be obtained as compared to a scanner device having a poor quality 6.5 inch video graphics array (VGA) display.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An auto document feeder (ADF)-type scanner device, the scanner device comprising:
 a sheet discharging unit into which documents are discharged;
 a sheet feeding unit;
 a keyboard that covers a top of the sheet discharging unit, the key board being a full keyboard having character input keys each assigned with a single character;
 a display that covers a top of the sheet feeding unit;
 a control unit; and
 a storage unit, wherein
 the control unit includes
  an image reading unit for controlling a reading of image data from original documents,
  an image storing unit for storing the image data read by the image reading unit in the storage unit, and a display control unit for controlling the display to display the image data of any of the original documents based on the image data stored in the storage unit by the image storing unit, and the keyboard and the display cover a top of a body of the scanner device as a whole.

2. The scanner device according to claim 1, wherein the control unit further includes a page managing unit for assigning page numbers to a plurality of the image data read by the image reading unit in a sequence in which the original documents are read, and for storing the image data in the storage unit as one or more files each of which includes the image data that are read sequentially and assigned with page numbers consecutively.

3. The scanner device according to claim 2, wherein the display control unit is configured to control the display to receive, from a user, at least one of a delete instruction, a change instruction of the page numbers, or a merge instruction of the files to be carried out on the image data stored in the storage unit, and the page managing unit is configured to delete the image data when the delete instruction is input by the user, change the corresponding page numbers when the change instruction of the page numbers is input by the user, and merge the files when the merge instruction of the files is input by the user.

4. The scanner device according to claim 3, wherein the display control unit is configured to control the display for enabling user input of the at least one of the change instruction of the page numbers, the merge instruction of the files, or the delete instruction by a dragging operation.

5. The scanner device according to claim 2, wherein, upon the image reading unit reading new image data from the original documents to be added to the files, the page managing unit is configured to assign page numbers following the last page number in the files to the new image data, add the new image data to the files, and store the added image data in the storage unit.

6. The scanner device according to claim 1, wherein the display control unit is configured to control the display to receive, from a user, at least one of an enlarge instruction, a reduce instruction, a rotate instruction, or a move instruction to be carried out on the image data, and the control unit further includes an image processing unit for performing image processing on the image data in accordance with the corresponding instruction, when the at least one of the enlarge instruction, the reduce instruction, the rotate instruction, or the move instruction to be carried out on the image data is input by the user.

7. The scanner device according to claim 6, wherein the display control unit is configured to control the display for enabling user input of at least one of an enlarge instruction, a reduce instruction, a rotate instruction, or a move instruction by a dragging operation.

8. The scanner device according to claim 1, wherein the display control unit is configured to control the display to display a list of thumbnail images of a plurality of pieces of the image data stored in the storage unit.

9. The scanner device according to claim 1, wherein the control unit further includes a character recognizing unit for retrieving characters, symbols, or drawings from the image data as character-including data, and the display control unit is configured to control the display to display the character-including data retrieved by the character recognizing unit such that the characters, the symbols, or the drawings are editable by a user.

10. The scanner device according to claim 1, wherein the display has a resolution of equal to or higher than 1024×768 pixels.

11. The scanner device according to claim 1, wherein the display includes a touch panel.

12. The scanner device according to claim 1, wherein the display has a display size of equal to or larger than 8.4 inches.

13. The scanner device according to claim 1, wherein the keyboard and the display are configured to be movable to expose one of the sheet charging unit and the sheet feeding unit.

14. The scanner device according to claim 1, wherein the keyboard completely covers the top of the sheet discharging unit, and the display completely covers the top of the sheet feeding unit.

15. A scanner device, comprising:

a sheet discharging unit into which documents are discharged;

a sheet feeding unit;

a keyboard that covers a top of the sheet discharging unit, the key board being a full keyboard having character input keys each assigned with a single character;

a display that covers a top of the sheet feeding unit;

a control unit;

a storage unit; and an auto document feeder (ADF) mechanism for feeding documents from the sheet feeding unit to the sheet discharging unit, wherein the control unit includes an image reading unit for controlling a reading of image data from original documents, an image storing unit for storing the image data read by the image reading unit in the storage unit, and a display control unit for controlling the display to display the image data of any of the original documents based on the image data stored in the storage unit by the image storing unit, wherein the keyboard and the display cover a top of a body of the scanner device as a whole.

16. The scanner device according to claim 15, wherein the keyboard and the display are visible and operable by a user at any time during document feeding, scanning, and discharging.

17. The scanner device according to claim 15, wherein the keyboard and the display are configured to be movable to expose one of the sheet charging unit and the sheet feeding unit.

18. The scanner device according to claim 15, wherein the keyboard completely covers the top of the sheet discharging unit, and the display completely covers the top of the sheet feeding unit.

19. An image reading and display method to be executed by an auto document feeder (ADF)-type scanner device comprising a sheet discharging unit into which documents are discharged, a sheet feeding unit, a keyboard that covers a top of the sheet discharging unit, the key board being a full keyboard having character input keys each assigned with a single character, a display that covers a top of the sheet feeding unit, a control unit, and a storage unit, wherein the keyboard and the display cover a top of a body of the scanner device as a whole; the method comprising:

an image reading step of controlling a reading of image data from original documents;

an image storing step of storing the image data read at the image reading step in the storage unit; and a display control step of controlling the display to display the image data of any of the original documents based on the image data stored in the storage unit at the image storing step, wherein the steps are executed by the control unit.

20. The method according to claim 19, wherein the keyboard and the display are configured to be movable to expose one of the sheet charging unit and the sheet feeding unit.

* * * * *